Dec. 6, 1927.
W. C. McKESSON
SETTLING TANK
Original Filed Nov. 20, 1925
1,652,036
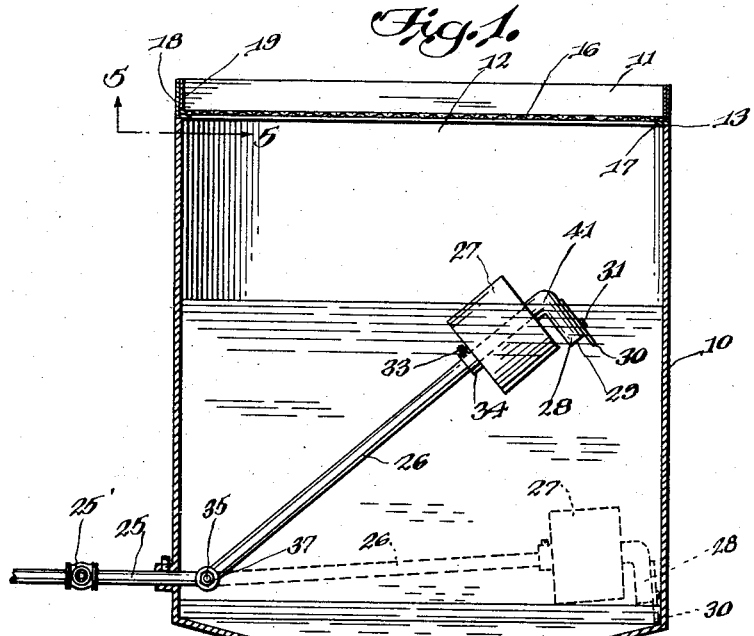
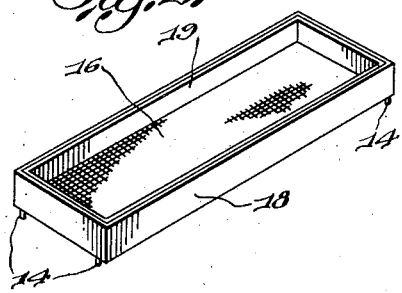
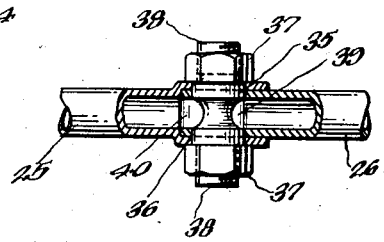
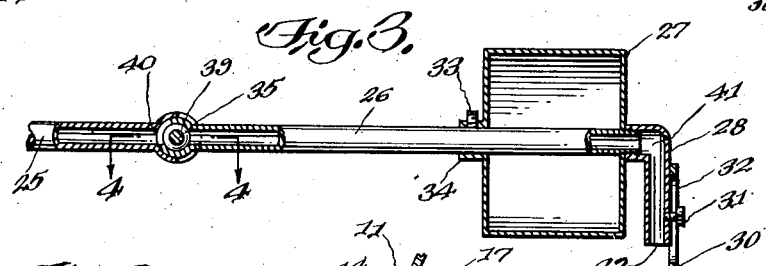
Wm. C. McKesson
INVENTOR
BY Victor J. Evans
ATTORNEY Patented Dec. 6, 1927.

1,652,036

UNITED STATES PATENT OFFICE.

WILLIAM C. McKESSON, OF CHICAGO, ILLINOIS.

SETTLING TANK.

Application filed November 20, 1925, Serial No. 70,378. Renewed April 30, 1927.

This invention relates to new and useful improvements in settling tanks especially designed for separating foreign particles of matter from used oil such as is drained from a crank case of an automobile, and has for its principal object the production of a device of this character which will embody the desired features of simplicity in structure and manufacture.

Other objects will appear hereinafter.

The invention consists in the combination and arrangement of parts hereinafter described and claimed.

The invention will be best understood by reference to the accompanying drawing forming a part of this specification and in which, Fig. 1 is a vertical sectional view of the invention showing the interior thereof, Fig. 2 is a perspective view of a strainer embodied in the invention, Fig. 3 is a fragmentary sectional view, partly in section, of the float arrangement embodied in the invention, Fig. 4 is a sectional detail view taken substantially on line 4—4 of Fig. 3, Fig. 5 is a fragmentary horizontal sectional view of the invention taken substantially on line 5—5 of Fig. 1, and Fig. 6 is a perspective view of a stop member embodied in the invention.

To fully understand the invention reference is made to the accompanying drawing illustrating the preferred form of construction and in which an open tank 10 is provided with a removable strainer 11 at the open end 12 thereof and positioned upon the peripheral edges 13 of the tank and retained in such position by pin members 14 which extend along the outer wall surface 15 of the tank. The strainer as illustrated is box like in structure and includes a wire mesh bottom 16 supported by inturned edges 17 formed as a part of the side walls 18 and clamped in close proximity with the ends 17 by a ring member 19. The bottom of the tank is inclined downwardly to an outlet opening 20 formed in an extending portion 21 having threaded engagement as at 22 with a drain pipe 23 passage through which is controlled by a suitable valve 24.

Swivelly carried by an outlet pipe 25, passage through which is controlled by a suitable valve 25', is a float arm 26 carrying an adjustable air tight float 27 and having an angled end 28 formed at its inlet end 29 and extending in a direction toward the bottom of the tank and provided with an adjustable stop 30 arranged and adapted to limit downward movement of the float arm to keep the same clear of settlement in the bottom of the tank. The adjustability of the stop 30 is accomplished through the medium of a set screw 31 which is carried by the bent end portion 28 of the arm and extends through an elongated slot 32. The adjustability of the float 27 is accomplished through the medium of a set screw 33 having threaded engagement in a collar 34 and adapted to be screwed into engagement with the float arm 26.

The swivel connection between the float arm 26 and the outlet pipe 25 includes a bolt 35 passing through aligned holes 36 formed in the outlet pipe and float arm and retained in position by nuts 37 threaded on the threaded end portions 38. The bolt 35 has an annular groove 39, formed therein which opens communication between the pipe 25 and the float arm 26 as at 40, Fig. 3.

In use the used oil is received from the crank case through the strainer 16 into the tank 10 filling the tank and causing the float to raise the float arm with the angled inlet end thereof submerged in the fluid. It is important to note that the float is of sufficient weight to retain the angled end submerged in the oil so that the level of the oil is on a horizontal line through the middle of the passage of the float arm at the bending point indicated at 41. This arrangement is such that by reason of the position of the angled end and weight of the float, a slow continuous flow of the oil is allowed permitting such settlement in the oil to find lodgement at the inclined tank bottom during the passage of the fluid through the float arm 26 and pipe 25.

After the clean oil has been drained from the tank the settlement is allowed passage through the outlet pipe upon opening of the valve 24.

While I have shown and described the preferred form of my invention it is to be understood that various changes and alterations may be carried out during manufacture without departing from the spirit of the invention or the scope of the appended claims.

This invention having been set forth, what I claim as new and useful is:

1. In a settlement tank of the class described including an outlet pipe, a float arm having an inlet end portion extending downwardly toward the bottom wall of the tank, means swivelly connecting the float arm to the outlet pipe, a stop member carried by the inlet end portion of the float arm and extending parallel with respect to the inlet end portion with an end portion projecting beyond the inlet end portion, and means for connecting the stop member to the inlet end portion.

2. In a settlement tank of the class described having a reticulated receiving end portion and an inclined bottom portion, a float arm having an inlet end portion extending downwardly toward the bottom wall of the tank, means swivelly connecting the float arm to the outlet pipe, a stop member carried by the inlet end portion of the float arm and extending parallel with respect to the inlet end portion with an end portion projecting beyond the inlet end portion and means for adjustably connecting the stop member to the inlet end portion.

In testimony whereof I affix my signature.

WILLIAM C. McKESSON.